(12) United States Patent  
Andkjar

(10) Patent No.: US 8,011,627 B2
(45) Date of Patent: Sep. 6, 2011

(54) HANDLEBAR ACCESSORY CLAMP

(76) Inventor: Eric Andkjar, Callicoon, NY (US)

( * ) Notice: Subject to any disclaimer, the term of this patent is extended or adjusted under 35 U.S.C. 154(b) by 913 days.

(21) Appl. No.: 11/893,046

(22) Filed: Aug. 14, 2007

(65) Prior Publication Data
US 2009/0045303 A1 Feb. 19, 2009

(51) Int. Cl.
F16M 13/00 (2006.01)

(52) U.S. Cl. ............... 248/214; 248/226.11; 248/276.1; 248/689

(58) Field of Classification Search ............... 248/214, 248/226.11, 228.1, 228.5, 228.6, 230.1, 230.3, 248/230.5, 230.6, 228.3, 213.41, 231.61, 248/231.71, 689, 278.1, 299.1, 276.1, 125.9; 224/420, 441, 447, 448, 558
See application file for complete search history.

(56) References Cited

U.S. PATENT DOCUMENTS

| 4,887,784 | A | * | 12/1989 | Kayali | 248/311.2 |
| 4,981,243 | A | | 1/1991 | Rogowski | |
| 5,014,956 | A | * | 5/1991 | Kayali | 248/311.2 |
| 5,667,176 | A | * | 9/1997 | Zamarripa et al. | 248/231.51 |
| 5,690,310 | A | * | 11/1997 | Brown | 248/448 |
| 6,186,383 | B1 | | 2/2001 | Kobdish | |
| 6,315,182 | B1 | | 11/2001 | Chen | |
| 6,378,815 | B1 | | 4/2002 | Lee | |
| 6,478,275 | B1 | * | 11/2002 | Huang | 248/284.1 |
| 6,942,131 | B2 | | 9/2005 | Trautman et al. | |
| 6,945,411 | B1 | | 9/2005 | Gates et al. | |
| 6,957,755 | B2 | | 10/2005 | Mahoney et al. | |
| 7,077,302 | B2 | | 7/2006 | Chuang | |
| 7,147,137 | B2 | | 12/2006 | Schanz et al. | |
| 2003/0075653 | A1 | * | 4/2003 | Li | 248/274.1 |
| 2004/0108348 | A1 | | 6/2004 | Barnes | |
| 2005/0045681 | A1 | | 3/2005 | Hancock et al. | |
| 2005/0109808 | A1 | | 5/2005 | Ueda | |
| 2006/0131467 | A1 | * | 6/2006 | Wang | 248/276.1 |
| 2006/0208023 | A1 | | 9/2006 | Manning | |
| 2006/0231697 | A1 | * | 10/2006 | Hsu | 248/125.9 |

* cited by examiner

Primary Examiner — Terrell McKinnon
Assistant Examiner — Steven M Marsh
(74) Attorney, Agent, or Firm — MacCord Mason PLLC

(57) ABSTRACT

A compact mounting device for releasibly securing a GPS receiver or other electronic accessory to a handlebar of a motorcycle or other handlebar-steered vehicle is described. The device includes a clamp releasibly attachable to a motorcycle handlebar; a cylindrical mounting post rotatably attached to the upper surface of the clamp; a mounting yoke pivotally attached to the mounting post; and a mounting plate to support a GPS receiver or other accessory rotatably attached to the yoke. The face of the accessory can be oriented toward the vehicle rider by rotating the post, tilting the yoke and/or rotating the mounting plate, so that the device is useable with a wide variety of handlebar orientations.

16 Claims, 3 Drawing Sheets

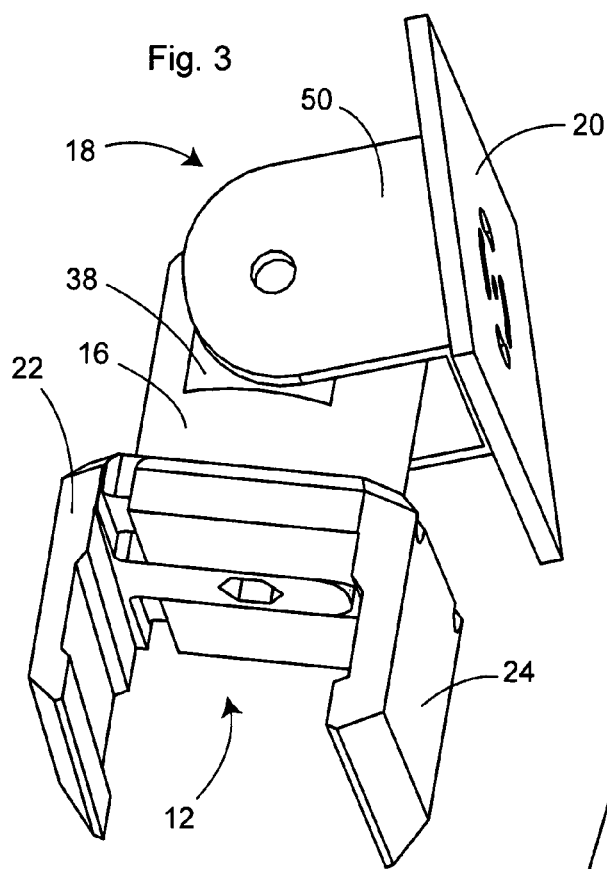
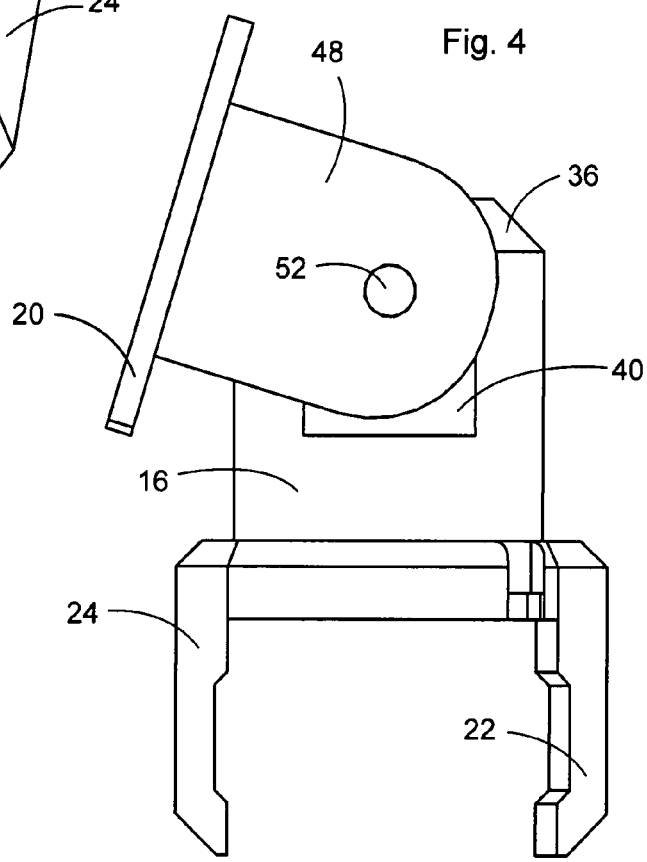

HANDLEBAR ACCESSORY CLAMP

BACKGROUND OF THE INVENTION (1) Field of the Invention

The present invention relates to a device for attaching an electronic accessory to a vehicle handlebar, and in particular to a compact device enabling three-way positioning of the accessory so that the face of the accessory can be pointed toward the user, permitting use of the device with handlebars of different orientations.

(2) Description of the Prior Art

Numerous handheld electronic accessories, e.g., GPS receivers, cell phones, radar detectors, and the like, are now in common use by consumers. Such devices cannot be safely held by riders of handlebar-steered vehicles, such as motorcycles, ATVs, bicycles, and the like, while riding. However, there is a need for such devices when using such vehicles, particularly GPS receivers that enable the rider to determine his or her geographical location while riding and take advantage of such available GPS functions as driving directions, street locators, etc.

To address this need, the prior art has proposed various accessory mounting devices that clamp to a handlebar with a means being provided for attachment of the electronic accessory. However, such devices have not enjoyed wide consumer acceptance, at least in part due to their bulkiness and projecting components that can be hazardous to the rider. Moreover, the devices are not widely useful with handlebars of different shapes and orientations.

Therefore, there is a continuing need for a compact electronic accessory mounting device that is suitable for attachment to handlebars of different configurations, which will enable three-way positioning of an electronic accessory mounted on the device so that the accessory can be easily viewed by a rider.

SUMMARY OF THE INVENTION

The present invention is directed to a mounting device for releasably securing an electronic accessory such as a GPS receiver to a handlebar of a handlebar-steered vehicle, such as a motorcycle. Generally, the mounting device is comprised of a clamp releasably attachable to a vehicle handlebar, a mounting post rotatably attached to the upper surface of the clamp, a mounting yoke pivotally attached to the post, and an accessory mounting plate rotatably attached to the yoke.

In order to readily attach and release the mounting device from a handlebar, the clamp is preferably comprised of front and back clamp sections attachable against opposite sides of the handlebar and to each other. That is, one clamp section is attached against the front of the handlebar, i.e., the side of the handlebar away from the rider, and the other clamp section is attached against the back of the handlebar, i.e., the side of the handlebar toward the rider.

A handlebar-steered vehicle is generally referred to as having handlebars, even though the two handlebars may be one continuous bar. Generally, a handlebar is understood to have a proximal end at a center steering post and a free distal end that normally includes a handgrip. Reference to a handlebar in the present invention is intended to mean a handlebar section with proximal and distal ends. While the invention will be described in terms of a single mounting device that is attachable to a handlebar, it is to be understood that multiple mounting devices may be used, e.g., a first mounting device can be clamped to one handlebar and a second mounting device can clamped to the other vehicle handlebar, thereby enabling mounting of two different electronic accessories.

In order to provide secure mounting, one of the mounting clamp sections preferably includes an upper surface positionable above a handlebar for attachment of the mounting post, while the other clamp section includes mating segments, e.g., first and second top arms, slidable into recesses in the first clamp section top plate. Each clamp section also includes an inner clamping face, with the faces being toward each other for placement against the handlebar. Since some handlebars may taper toward their distal ends, the clamping faces may be inclined inwardly from the proximal side of the clamp toward the distal side of the clamp.

The mounting post has a lower surface rotatably mounted on the upper surface of the clamp and a longitudinal axis perpendicular to the clamp upper surface. For compactness, the post is preferably cylindrical with an inwardly tapered upper edge, i.e., the upper end of the post terminates in a truncated cone, and parallel, planer yoke mounting surfaces on opposite sides of the post. The post may be attached to the clamp with a connector pin extending along the longitudinal axis of the post.

The mounting yoke preferably includes an attachment plate with parallel side edges, and parallel spaced arms that extend rearwardly from the side edges for pivotal attachment along the planar surfaces of the mounting post. The distal ends of the arms are radiused so that the projecting parts of the cylinder beneath the planar surfaces do not obstruct pivoting of the yoke. The yoke is joined to the mounting post with a mounting pin that extends transverse to the longitudinal axis of the mounting post.

An accessory mounting plate is attached to the yoke attachment plate, with the accessory mounting plate being parallel to the pivot axis of the yoke. The accessory mounting plate includes an accessory mounting surface that is configured for attachment to the accessory to be mounted. Preferably, the mounting plate, which may be rectangular, is rotatably attached to the yoke, so that the plate can be rotated to a desired orientation for viewing by the rider. The accessory mounting plate and the yoke attachment plate preferably have selectively mateable locking holes to secure the mounting plate in the desired orientation relative to the yoke.

When used, the mounting surface is positioned toward the rider by rotating the mounting post to pan the mounting surface, by pivoting the yoke to tilt the mounting surface, and/or by rotating the mounting plate relative to the yoke. Thus, the mounting surface has three degrees of orientation, ensuring that any electronic device attached to the mounting surface can be positioned facing the rider for easy viewing.

BRIEF DESCRIPTION OF THE DRAWINGS

FIG. 3 is a third perspective view of the mounting device showing features of the bottom of the device.

FIG. 4 is a side view of the device.

DETAILED DESCRIPTION OF THE INVENTION

Figure 1:
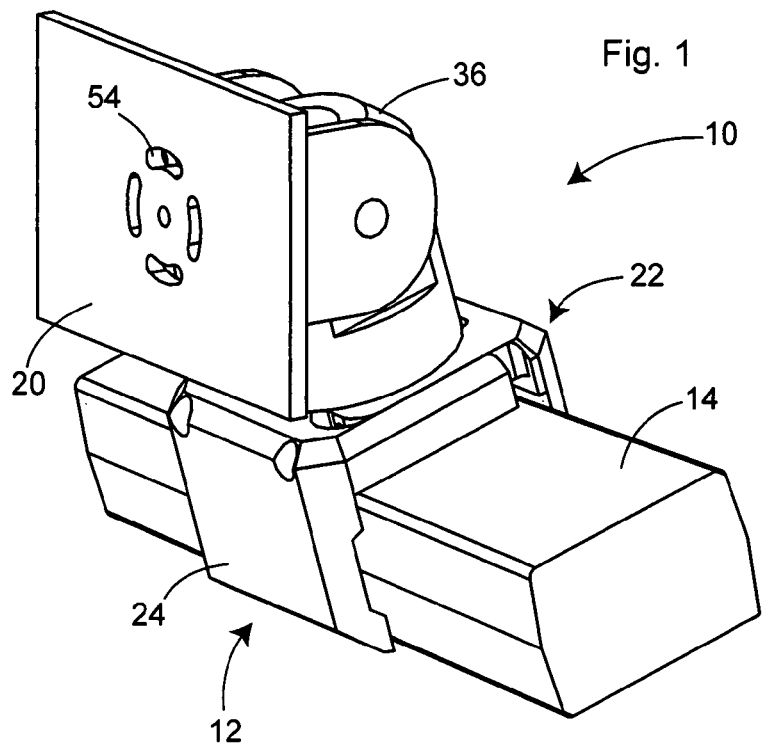
FIG. 1 is a first perspective view of the mounting device showing features of the front of the device.
Figure 2:
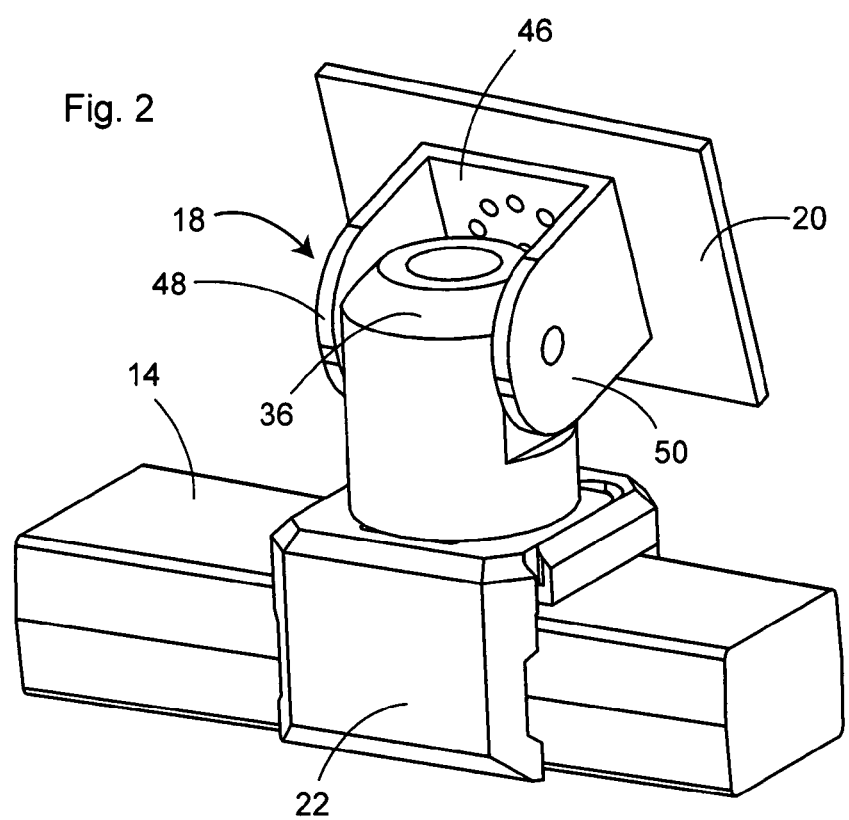
FIG. 2 is a second perspective view of the mounting device showing features of the rear of the device.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

As illustrated in the drawings, a preferred embodiment of the mounting device, generally 10, is comprised of clamp, generally 12, releasibly attachable to a handlebar 14, mounting post 16 rotatably attached to the upper surface of clamp 14, mounting yoke, generally 18, pivotally attached to post 16, and accessory mounting plate 20 rotatably attached to yoke 18.

Figure 5:
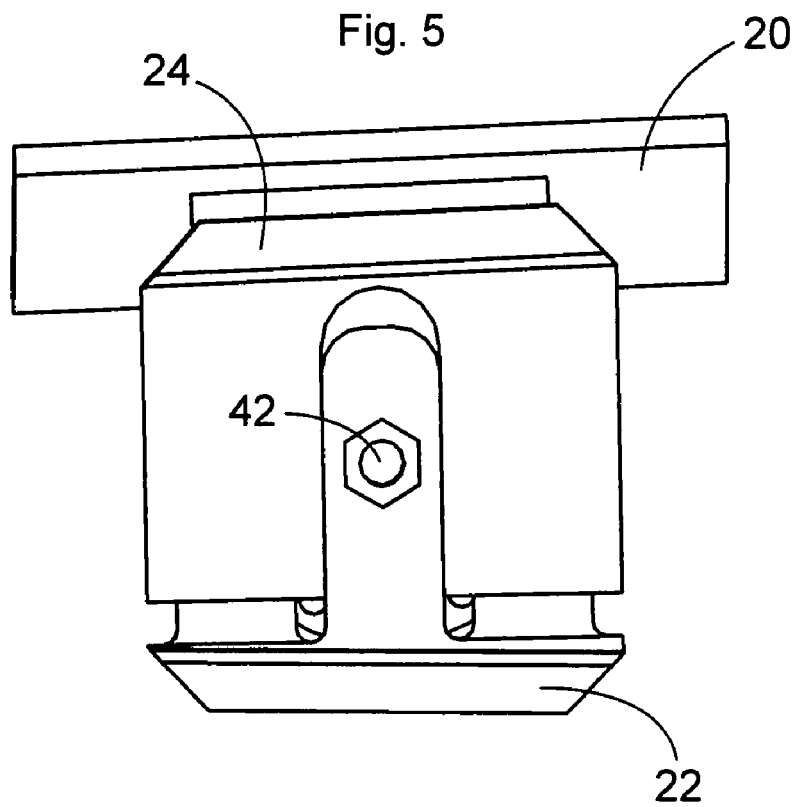
FIG. 5 is a bottom view of the device.
Figure 6:
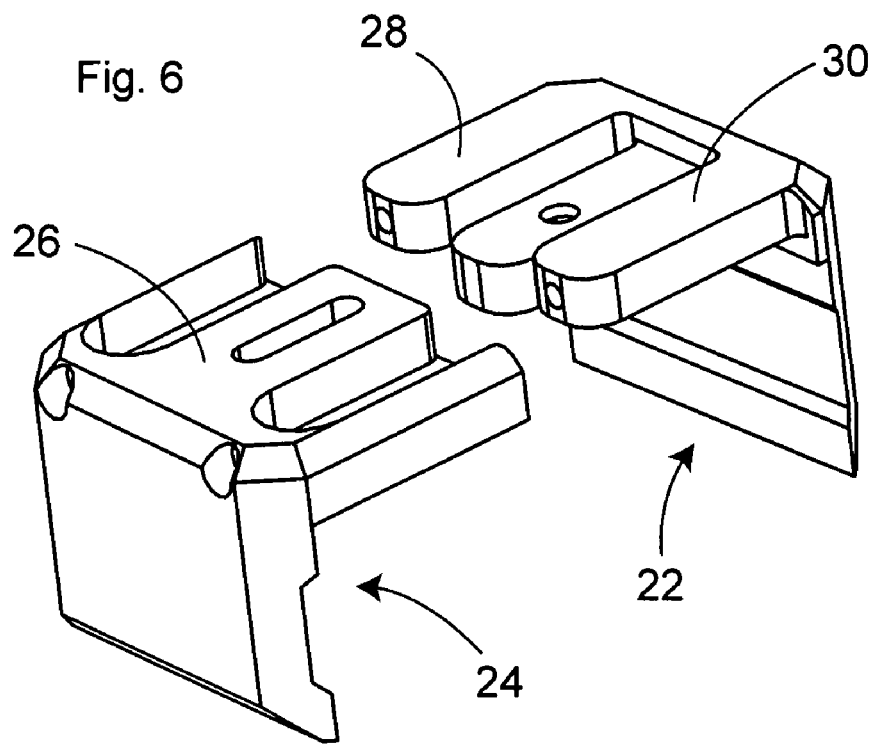
FIG. 6 is an exploded perspective view of the device clamp.

Clamp 12, best illustrated in FIG. 6, is comprised of front and back clamp sections 22 and 24, respectively. Clamp section 24 includes upper surface 26 for attachment of mounting post 16, while clamp section 22 includes first and second arms slidable into recesses in top plate 26 with the upper surfaces of arms 28 and 30 being in a plane with upper surface 26. Clamp sections 22 and 24 include inner clamping faces that face toward each other for placement against handlebar 14. As best illustrated in FIG. 5, the clamping faces may be inclined inwardly from the proximal side of clamp 12 toward the distal side of clamp 12.

Cylindrical mounting post 16 has a lower surface rotatably attached to the upper surface of clamp 12 and a longitudinal axis perpendicular to the upper surface of clamp 12. Post 16 includes an inwardly tapered upper edge 36 in the shape of a truncated cone, and parallel planer yoke mounting surfaces 38 and 40 on opposite sides of post 16. Connector pin 42 extends though a bore along the longitudinal axis of post 16.

Mounting yoke 18 is comprised of attachment plate 46 and parallel side arms 48 and 50 which extend backward from the side edges of attachment plate 46 for pivotal attachment alongside planar surfaces 38 and 40 on post 16. The distal ends of arms 48 and 50 are radiused so that pivoting of yoke 18 will not be obstructed by post 16. Yoke 18 is joined to post 16 with mounting pin 52, which extends transverse to the longitudinal axis of post 16. Accessory mounting plate 20 is rotatably attached to yoke attachment plate 46 and is locked in the desired orientation with selectively mateable locking holes 54.

When used, mounting device 10 can be oriented in three different ways, depending on the configuration of the handlebar and desired location of the device, to orient the face of accessory mounting plate 20 toward the rider. Specifically, mounting post 16 can be rotated to pan the position of plate 20, yoke 18 can be pivoted to tilt plate 20, and plate 20 can be rotated. This three-way adjustability of plate 20 and an electronic accessory mounted on plate 20, in combination with the compact construction of device 10, renders device 10 a significant improvement over prior art devices designed to mount accessories on handlebars.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A mounting device for releasibly securing an electronic accessory to a handlebar of a handlebar-steered vehicle comprising:
    a) a clamp releasibly attachable to a vehicle handlebar, said clamp including a first clamp section having an upper surface positionable above a handlebar and a second clamp section including mating sections insertable onto recesses in said first section upper surface;
    b) a cylindrical mounting post with opposed parallel, planar cutouts rotatably attached to said upper surface, said post having a longitudinal axis perpendicular to said clamp upper surface;
    c) a mounting yoke pivotally attached on said post cutouts, said yoke being pivotal about a pivot axis transverse to said post longitudinal axis; and
    d) an accessory mounting plate attached to said yoke, said plate being parallel to said pivot axis and including an accessory mounting surface.

2. The mourning device of claim 1, wherein said mounting yoke includes an attachment plate with parallel side edges and parallel arms extending from said side edges, said parallel arms being pivotally attachable to said mounting post.

3. The mounting device of claim 1, wherein said accessory mounting plate is rotatably mounted on said yoke.

4. The mounting device of claim 1, wherein said accessory mounting plate is rectangular.

5. The mounting device of claim 1, wherein said yoke is attached to said mounting post with a pin extending parallel to said clamp upper surface.

6. The mounting device of claim 1, wherein said mounting post includes an inwardly tapered upper edge.

7. A mounting device for releasibly securing an electronic accessory to a handlebar of a motorcycle comprising:
    a) a clamp releasibly attachable to a motorcycle handlebar, said clamp having front and back clamp sections positionable against opposite sides of said handlebar and attachable to each other, one of said clamp sections having an upper surface positionable above a handlebar and the other clamp section having mating sections insertable onto recesses in said upper surface;
    b) a cylindrical mounting post with opposed parallel, planar cutouts rotatably attached to said upper surface, said post having a longitudinal axis perpendicular to said clamp upper surface;
    c) a mounting yoke having an attachment plate with parallel side edges and parallel arms extending from said side edges, said parallel arms being pivotally attached on said mounting post cutouts, said yoke being pivotal about a pivot axis transverse to said post longitudinal axis; and
    d) an accessory mounting plate attached to said yoke attachment plate, said accessory mounting plate being parallel to said pivot axis and including an accessory mounting surface.

8. The mounting device of claim 7, wherein said accessory mounting plate is rotatably mounted on said yoke.

9. The mounting device of claim 7, wherein said accessory mounting plate is rectangular, 10. The mounting device of claim 7, wherein said yoke is attached to said mounting post with a pin extending parallel to said clamp upper surface.

11. The mounting device of claim 7, wherein said mounting post includes an inwardly tapered upper edge.

12. The mounting device of claim 7, wherein said yoke arms have radiused outer ends.

13. A mounting device for releasibly securing a GPS receiver to a handlebar of a motorcycle comprising:
    a) a clamp releasibly attachable to a motorcycle handlebar, said clamp having front and back clamp sections attachable on opposite sides of said handlebar and to each other, and an upper surface;
    b) a cylindrical mounting post rotatably attached to said upper surface, said post having a longitudinal axis perpendicular to said clamp upper surface, an inwardly tapered upper edge, and parallel planar opposed yoke mounting surfaces;

c) a mounting yoke having an attachment plate with parallel side edges and parallel arms with radiused outer ends extending from said side edges, said parallel arms being pivotally attached to said mounting post against said yoke mounting surfaces, said yoke being pivotal about a pivot axis transverse to said post longitudinal axis; and d) a GPS receiver mounting plate attached to said yoke attachment plate, said accessory mounting plate being parallel to said pivot axis and including an accessory mounting surface.

14. The mounting device of claim 13, wherein one of said clamp sections includes an upper surface positionable above a handlebar and the other clamp section includes segments slidable onto recesses in said upper surface, said mounting post being rotatably attachable to said clamp section upper surface.

15. The mounting device of claim 13, wherein said accessory mounting plate is rotatably mounted on said yoke, said accessory mounting plate and said yoke attachment plate having selectively mateable locking holes.

16. The mounting device of claim 13, wherein said clamp has a proximal side and a distal side, said clamp sections having clamping faces inclined inwardly toward said distal side.

* * * * *